US009660694B2

(12) United States Patent
Eriksson et al.

(10) Patent No.: US 9,660,694 B2
(45) Date of Patent: May 23, 2017

(54) RADIO UNIT AND METHOD PERFORMED BY A RADIO UNIT OPERABLE IN A BASE STATION SYSTEM OF A WIRELESS COMMUNICATION NETWORK FOR REDUCING INTERFERENCE AT THE RADIO UNIT

(71) Applicant: Telefonaktiebolaget L M Ericsson (publ), Stockholm (SE)

(72) Inventors: Per-Erik Eriksson, Stockholm (SE); Miguel Berg, Upplands Väsby (SE); Chenguang Lu, Sollentuna (SE); Elmar Trojer, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 97 days.

(21) Appl. No.: 14/407,538

(22) PCT Filed: Jul. 3, 2013

(86) PCT No.: PCT/SE2013/050851
§ 371 (c)(1),
(2) Date: Dec. 12, 2014

(87) PCT Pub. No.: WO2015/002584
PCT Pub. Date: Jan. 8, 2015

(65) Prior Publication Data
US 2016/0226555 A1      Aug. 4, 2016

(51) Int. Cl.
*H04B 3/32* (2006.01)
*H04B 15/00* (2006.01)
(Continued)

(52) U.S. Cl.
CPC ............. *H04B 3/32* (2013.01); *H04B 1/10* (2013.01); *H04B 15/00* (2013.01); *H04W 88/085* (2013.01)

(58) Field of Classification Search
CPC ... H04B 1/10; H04B 3/20; H04B 3/21; H04B 3/32; H04B 3/487; H04B 3/50; H04B 3/54; H04B 3/542; H04B 15/00; H04W 88/085
See application file for complete search history.

(56) References Cited

U.S. PATENT DOCUMENTS 5,844,949 A * 12/1998 Hershey ................ H04B 3/54
                                              340/12.33
6,055,297 A *  4/2000 Terry .................... H04B 3/32
                                              379/1.01
(Continued)

FOREIGN PATENT DOCUMENTS

WO    2006120513 A1    11/2006

OTHER PUBLICATIONS

Pagnanelli, Chris, "Performance of Ad Hoc Cat5e Models with the Preliminary Cat5e Alien Model", IEEE 802.3 Interim May 2003 10GBASE-T, Solarflare Communications, available online at http://www.ieee802.org/3/10GBT/public/may03/pagnanelli_3_0503.pdf, May 2003, 1-10.

(Continued)

*Primary Examiner* — David B. Lugo
(74) *Attorney, Agent, or Firm* — Murphy, Bilak & Homiller, PLLC (57) ABSTRACT

Disclosed is a method performed by a radio unit (10) operable in a base station system of a wireless communication network, for reducing interference at the RU. The base station system comprises a baseband unit (30) the radio unit (10) and a plurality of radio heads (21-26) wherein the radio unit is connected to the plurality of radio heads via a number of metallic conductors (40), and wherein a signal is to be communicated to the radio unit at a first frequency range over one of the number of metallic conductors from one of the plurality of radio heads. The method comprises: detecting (206) if there is any near end crosstalk, NEXT, at a receiver of the RU, the receiver being connected to the one of the number of metallic conductors, and, when NEXT is detected, triggering (210) the one of the plurality of RHs to send the signal to be communicated over the one of the number of metallic conductors at a second frequency range different from the first frequency range where a lower NEXT (Continued)

is expected than at the first frequency range. Disclosed are also a corresponding radio unit and a computer program.

8 Claims, 7 Drawing Sheets

(51) Int. Cl.
*H04W 88/08* (2009.01)
*H04B 1/10* (2006.01)

(56) References Cited

U.S. PATENT DOCUMENTS

| | | | |
|---|---|---|---|
| 2004/0004943 A1 | 1/2004 | Kim et al. | |
| 2004/0213216 A1* | 10/2004 | Barrass | H04B 3/32 370/360 |
| 2004/0218756 A1* | 11/2004 | Tang | H04B 3/21 379/417 |
| 2008/0145061 A1 | 6/2008 | Lee et al. | |
| 2011/0243291 A1* | 10/2011 | McAllister | H04J 3/0658 375/376 |

OTHER PUBLICATIONS

Unknown, Author, "Part 3: Carrier Sense Multiple Access with Collision Detection (CSMA/CD) Access Method and Physical Layer Specifications", IEEE Std 802.3-2005, IEEE Standard for Information technology—Telecommunications and information exchange between systems—Local and metropolitan area networks—Specific requirements, IEEE-SA Standards Board, LAN/MAN Standards Committee, IEEE Computer Society, Sep. 26, 2008, 1-2997.

* cited by examiner

RADIO UNIT AND METHOD PERFORMED BY A RADIO UNIT OPERABLE IN A BASE STATION SYSTEM OF A WIRELESS COMMUNICATION NETWORK FOR REDUCING INTERFERENCE AT THE RADIO UNIT

TECHNICAL FIELD

The present disclosure relates generally to a method performed by a radio unit operable in a base station system of a wireless communication network, for reducing interference at the radio unit, wherein the base station system comprises a baseband unit, the radio unit and a plurality of radio heads, wherein the radio unit is connected to the plurality of radio heads via a number of metallic conductors. The present disclosure further relates to a corresponding radio unit and a corresponding computer program and computer program product.

BACKGROUND

Wireless communication networks have evolved from pure voice networks to high-speed data networks. The 4th generation radio network long-term evolution, LTE, is able to provide capacities exceeding 100 Mbit/s in an ultra-dense small-cell installation. As most of the traffic in the wireless communication networks will be generated in-doors, ultra-dense small-cell indoor network solutions are required. Different approaches have been taken to provide network architectures able to cost-efficiently and reliably meet the run on high mobile capacity.

One such approach is to re-use existing metallic conductors in buildings, such as copper cables, e.g. Ethernet cables, and to employ a distributed base station system comprising a base band unit, BBU, and a plurality of radio heads, RH. The BBU would communicate with the plurality of RHs via the metallic conductors; one metallic conductor may be connected to one RH. Such a system may be called a Radio over Copper, RoCU, system.

The metallic conductors in a RoCU system may be placed physically close to other cabling carrying legacy services such as Ethernet traffic. For example, the metallic conductors of a RoCU system may be placed in the same cable bundle as the cabling carrying legacy services. Such scenarios may cause crosstalk between the metallic conductors of the RoCU system and the cabling carrying legacy services. Crosstalk is a disturbance wherein signals sent over one metallic conductor causes disturbances to signals sent in another metallic conductor. Crosstalk may occur in this case if the RoCU system uses a frequency bandwidth that overlaps with the frequency bandwidth used by the legacy service. Crosstalk may cause degradation to the signals sent in the system experiencing the disturbance. It can either be so that the transmission over the metallic conductors of the RoCU system are degraded due to crosstalk from the legacy service traffic, or vice versa.

Consequently, there is a need to prevent such crosstalk or at least reduce such crosstalk between metallic conductors of a RoCU system and metallic conductors of another communication system.

SUMMARY

It is an object of the invention to address at least some of the problems and issues outlined above. It is an object to increase quality of signals communicated in a Radio over Copper, RoCU, system. It is another object to decrease interference on signals communicated in a Radio over copper system, which interference originates from other communication systems. It is another object to handle crosstalk occurring between metallic conductors of a RoCU-system and other cablings of another communication system, such as Ethernet cables.

It is possible to achieve these objects and others by using a method and an apparatus as defined in the attached independent claims.

According to a first aspect, a method is provided performed by a radio unit, RU, operable in a base station system of a wireless communication network, for reducing interference at the RU. The base station system comprises a baseband unit, BBU, the RU and a plurality of radio heads, RHs, wherein the RU is connected to the plurality of RHs via a number of metallic conductors, and wherein a signal is to be communicated to the RU at a first frequency range over one of the number of metallic conductors from one of the plurality of RHs. The method comprises detecting if there is any near end crosstalk, NEXT, at a receiver of the RU, the receiver being connected to the one of the number of metallic conductors. The method further comprises, when NEXT is detected, triggering the one of the plurality of RHs to send the signal to be communicated over the one of the number of metallic conductors at a second frequency range different from the first frequency range where a lower NEXT is expected than at the first frequency range.

According to a second aspect, an RU is provided operable in a base station system of a wireless communication network, and configured for reducing interference at the RU. The base station system comprises a BBU, the RU and a plurality of RHs, wherein the RU is connected to the plurality of RHs via a number of metallic conductors, and wherein a signal is to be communicated at a first frequency range over one of the number of metallic conductors from one of the plurality of RHs. The radio unit comprises a detection unit for detecting if there is any near end crosstalk, NEXT at a receiver of the RU, wherein the receiver is arranged to be connected to the one of the number of metallic conductors. The radio unit further comprises a triggering unit, for triggering, when NEXT is detected, the one of the plurality of RHs to send the signal to be communicated over the one of the number of metallic conductors at a second frequency range different from the first frequency range where a lower NEXT is expected than at the first frequency range.

According to a third aspect, a computer program is provided comprising computer readable code means to be run on an RU of a base station system, the base station system comprising a BBU the RU and a plurality of RHs, wherein the RU is connected to the plurality of RHs via a number of metallic conductors, and wherein a signal is to be communicated at a first frequency range over the number of metallic conductors from one of the plurality of RHs. The computer readable code means causes the radio unit to perform the following steps: detecting if there is any near end crosstalk, NEXT, at a receiver of the RU, the receiver being connected to one of the number of metallic conductors, and, when NEXT is detected, triggering the one of the plurality of RHs to send the signal to be communicated over the one of the number of metallic conductors at a second frequency range different from the first frequency range where a lower NEXT is expected than at the first frequency range.

The above method and apparatus may be configured and implemented according to different optional embodiments.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to reduce crosstalk induced into metallic conductors of a RoCU system from cables of another communication system. This is achieved by detecting near-end crosstalk, NEXT, occurring in a receiver of a radio unit of the RoCU system and moving signals to be transmitted from radio heads of the RoCU system to the radio unit from a first frequency range to a second frequency range where less NEXT is experienced.

Figure 1:
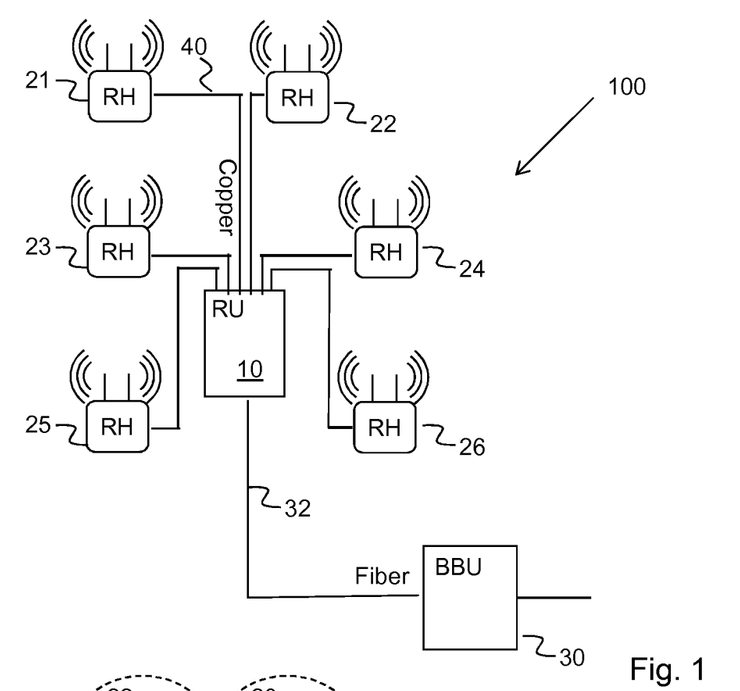
FIG. 1 is a schematic block diagram of a RoCU system according to an embodiment.

FIG. 1 shows an architecture of a base station system 100, also called a RoCU system, according to an embodiment of the invention for connecting antennas to a BBU 30 over metallic conductors 40, e.g. copper cables. The base station system 100 comprises the BBU 30 which is arranged to treat signals in a baseband frequency region, typically in a low frequency region. The base station system 100 further comprises a radio unit 10 connected to the baseband unit 30 via e.g. an optical fiber 32. The BBU 30 is arranged to generate and send a number of downlink baseband signals, also called IQ data flows, to the RU, which IQ data flows are directed to radio heads 21-26. The number of downlink baseband signals may be sent as a single digital signal from the BBU to the RU, over the optical fiber, e.g. using Common Public Radio Interface, CPRI. The radio unit, RU, 10 is arranged for generating downlink, DL, radio signals in a low intermediate frequency, IF, band from the downlink baseband signals received from the baseband unit 30. The base station system 100 further comprises a number of remote radio heads, RH, 21-26 connected to the RU 10 via metallic conductors 40, e.g. of copper. The RHs may be connected to the RU via separate conductors, one conductor to one RH. The radio unit 10 is further arranged to send the DL IF radio signals to the RHs via the metallic conductors. An RH 21-26 is arranged for picking up the analog IF radio signals from the metallic conductor to which it is connected and for converting the IF signals to the actual radio frequency, RF, to be transmitted over the air from antenna(s) of the RH. A radio frequency region may be e.g. 400 MHz to 6 GHz. The RH comprises at least one antenna element for transmitting the DL signal to UEs.

In the uplink direction, the RHs 21-26 are each arranged to receive RF radio signals, mix the RF signal to an IF frequency to be transported over the metallic conductors towards the RU 10 for further processing. The RU is arranged to down-convert the received IF signal to a baseband frequency for further transmission to the BBU 30. Uplink and downlink IF signals may be transported over the metallic conductors 40 via frequency duplexing for FDD radios, and/or time duplexing for TDD radios.

Figure 2:
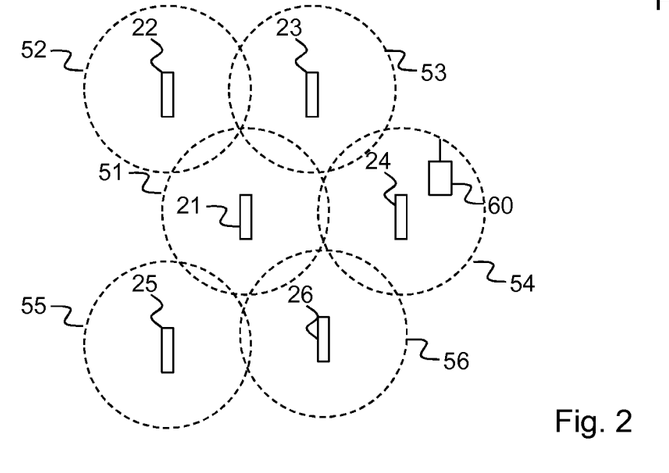
FIG. 2 is a schematic view of an exemplary cellular communication network to which coverage is provided by the RoCU system.

FIG. 2 shows a schematic view of an example of how the RHs 21-26 of FIG. 1 may be positioned to cover a geographical area. Each RH 21-26 covers a geographical area 51-56. A mobile station 60 that is situated in e.g. geographical area 54 will be connected to RH 24 and receive DL RF signals over the air from RH 24. Even though FIG. 2 shows circular geographical areas, so called omnicells, any other type of geographical area may be covered, such as an angular section, a part of a building floor etc. The RHs may be arranged in a building, e.g. on different floors of the building.

Figure 3:
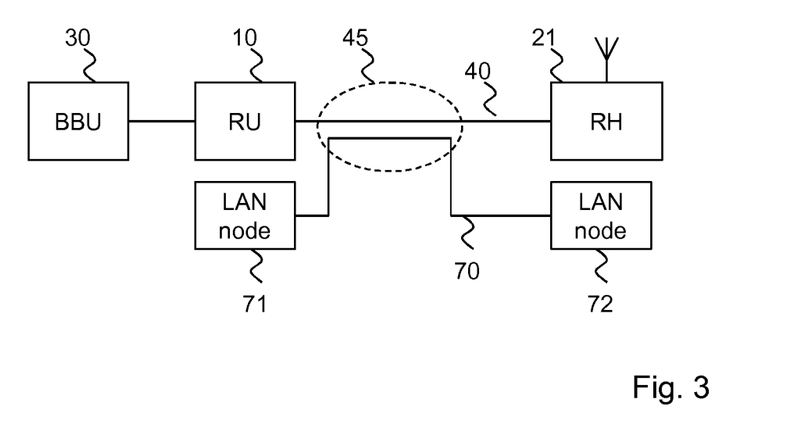
FIG. 3 is a schematic block diagram of a RoCU system with a closely lying LAN network.

As mentioned, there may be situations when a metallic conductor of the RoCU system experiences cross-talk from a metallic conductor of another communication system. FIG. 3 shows an example of such a situation. LAN nodes 71, 72 are connected via a cable 70 which may be a CAT5 cable. A metallic conductor 40, which may be a CAT 5 cable as well, between an RH 21 and an RU 10 of the RoCU system and the cable 70 of the LAN are arranged adjacent each other in the area 45. In this area there is a risk that Ethernet traffic sent over the LAN cable 70 may cause crosstalk in the metallic conductor 40.

Figure 4:
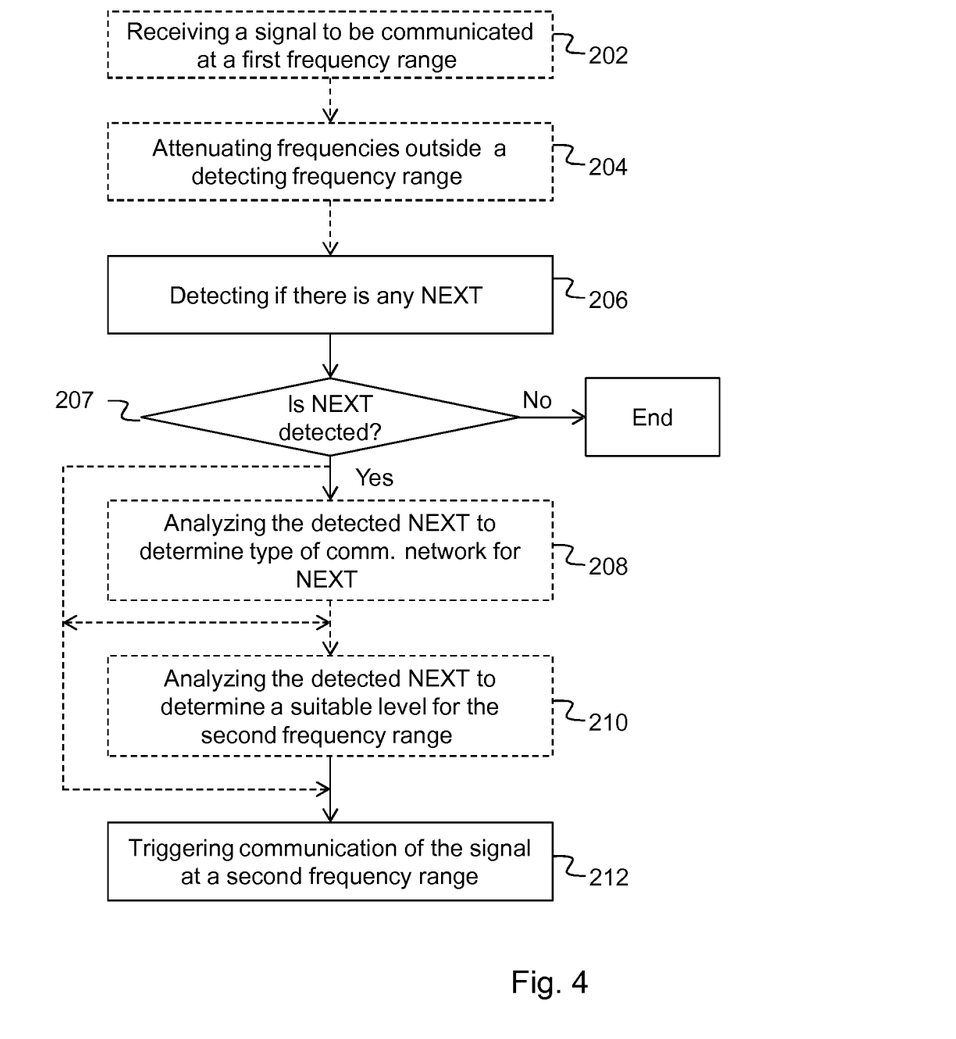
FIG. 4 is a flow chart illustrating a method in a node, according to possible embodiments.

According to an embodiment shown in FIG. 4, such crosstalk induced into a RoCU system is reduced by a method performed by an RU 10 operable in a base station system of a wireless communication network, for reducing interference at the RU, wherein the base station system comprises a BBU 30, the RU 10 and a plurality of RHs 21-26, wherein the RU 10 is connected to the plurality of RHs via a number of metallic conductors 40. Further, a signal is to be communicated to the RU at a first frequency range over one of the number of metallic conductors from one of the plurality of RHs. The method comprises detecting 206 if there is any near end crosstalk, NEXT, at a receiver of the RU, the receiver being connected to the one of the number of metallic conductors. The method further comprises, when NEXT is detected, triggering 210 the one of the plurality of RHs to send the signal to be communicated over the one of the number of metallic conductors at a second frequency range different from the first frequency range where a lower NEXT is expected than at the first frequency range.

A radio head is equivalent to an active antenna element, a radio unit is equivalent to a radio resource unit and a baseband unit is equivalent to a digital unit. Near End crosstalk is when signals from a transmitter of a first transceiver causes disturbances to a receiver of a second transceiver and wherein the first and the second transceivers are arranged in the same physical premise, or at least close to each other. "One of the number of metallic conductors" and "one of the plurality of RHs" may, as well as being exactly one, also be more than one metallic conductor and more than one RH.

By detecting NEXT and moving the signal to be communicated between the RU and the RH from a first frequency range to a second frequency range where the NEXT is expected to be lower than at the first frequency range, interference occurring due to NEXT is lowered, and consequently, a better signal is achieved (i.e. a signal with a higher signal to noise ratio, SNR) at the second frequency range than at the first frequency range in a RoCU base station system.

According to an embodiment, the method may further comprise receiving 202 the signal to be communicated at the first frequency range at the receiver of the RU. Further, the detecting 206 of the NEXT may be performed by detecting NEXT at a detecting frequency range outside the first frequency range.

If a signal is sent over the metallic conductor from the RH to the RU at the time when NEXT is detected it is difficult to detect NEXT in the first frequency range since the NEXT has a much lower signal strength than the actual signal. By detecting NEXT outside the first frequency range, the NEXT is detectable. An estimation of the NEXT in the first frequency range may be performed from the detected NEXT at the detecting frequency range. In other words, the measurement of the NEXT at the detecting frequency range may be used as an indicator of the NEXT in other frequency ranges; such as in the first frequency range and for finding second frequency ranges with a higher SNR. This can be performed with a good certainty if a certain type of disturbing system or disturbing cable can be assumed. Information of the disturbing system could be found by e.g. other measurements or from any kind of information of the disturbing system, such as network plans. The same kind of disturbing system may show similar NEXT characteristics.

According to another embodiment, the detecting 206 of the NEXT may be performed at a detecting frequency range lower than the first frequency range. It is easier to detect the NEXT if the NEXT is detected at a lower frequency range than the first frequency range since the NEXT has been found to be stronger at lower frequency ranges than at higher frequency ranges, and can thereby more easily be detected at lower frequencies than at higher frequencies.

According to another embodiment, the detecting 206 of the NEXT may be performed at a point of time when there is no signal received from the one of the plurality of RHs. When detecting the NEXT at a point of time when there is no signal received at the receiver it is possible to detect NEXT at the whole frequency spectra, for example at the first frequency range. When the NEXT is detected at the same frequency range as the signal is received, the disturbance of the NEXT to the received signal may be more exactly detected than if the NEXT is estimated at a different frequency range than the received signal.

According to another embodiment, the method may further comprise attenuating 204 frequencies outside a detecting frequency range when the detecting 206 is performed. By attenuating frequencies outside a detecting frequency range, using e.g. a band pass filter, it is more easy to detect NEXT if there is a signal sent from the RH to the RU at the first frequency range when NEXT is to be detected.

According to another embodiment, the method may further comprise analyzing 208 the detected NEXT to determine from which type of communication network the NEXT originates. By analyzing the NEXT to determine from which type of communication network the NEXT originates, a well-founded decision can be made what to do with the signal to be communicated. I.e. it could be decided with more precision to which second frequency range to move the signal to be communicated. For example, a NEXT from an Ethernet network has its special characteristics, e.g. there is a NEXT power dip at a certain frequency for all Ethernet networks. The NEXT may be analyzed by digitizing the NEXT signal and performing a Fast Fourier Transformation, FFT, on the digitized signal.

According to another embodiment, the method may further comprise analyzing 210 the detected NEXT to determine suitable frequencies for the second frequency range in which the NEXT is expected to be low. By analyzing the detected NEXT in more detail suitable frequencies for a second frequency range with low expected NEXT can be found with high precision.

Figure 5:
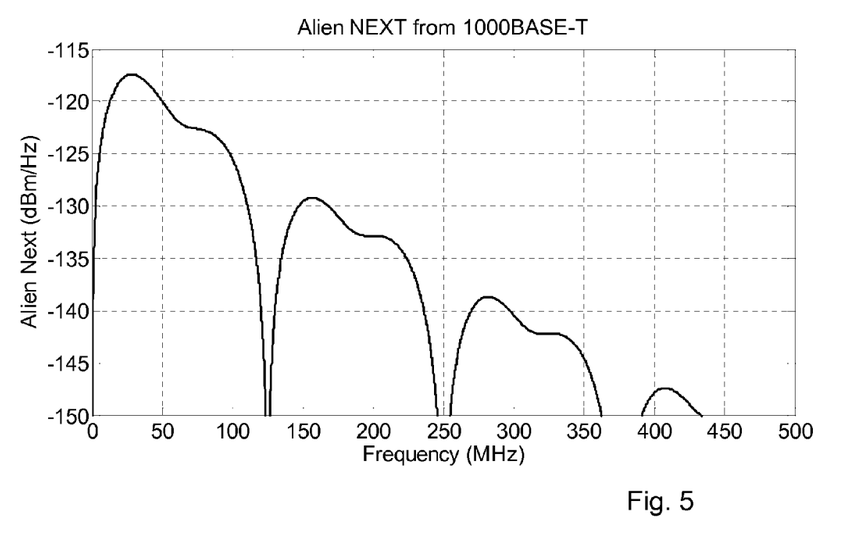
FIG. 5 is a diagram illustrating a graph of Alien NEXT as a function of frequency.

According to another embodiment, the analyzing 210 of the detected NEXT to determine suitable frequencies for the second frequency range in which the NEXT is expected to be low comprises analyzing the detected NEXT to detect a frequency range at a notch between a main lobe and a first side lobe of the NEXT, and wherein the detected frequency is selected to be the second frequency range. A main lobe of the NEXT is the part of the frequency band where the disturbance originates. A side lobe is a harmonic of the originating disturbance. The first side lobe is the first harmonic. The notch between the main lobe and the first side lobe is a dip in power of the NEXT between the main lobe and the first side lobe. In the example of FIG. 5, this notch appears around approximately 125 MHz. It has been found out that in many alien communication networks there is a dip in the power of the NEXT corresponding to a spectral null appearing at the inverse of the pulse period of the alien communication network. By selecting the second frequency range to be at this dip, the SNR for the received signal will be extra high in relation to the NEXT.

According to another embodiment, the NEXT is detected 206 by measuring a power level at the detecting frequency range at the receiver, and determining that NEXT is detected when the measured power level is above a threshold. By selecting a suitable level for the threshold it is possible to separate NEXT from a background noise level for example.

According to another embodiment, the NEXT originates from another communication network, such as Ethernet. Examples of such an Ethernet network are 100BASE-T and 1000BASE-T.

According to anther embodiment, the method further comprises triggering to perform the method on-demand or periodically. That the method is triggered to be performed on-demand may mean that the method is performed based on a request from another network node of the wireless communication system, e.g. triggered by a report from a UE informing of degraded signal quality.

According to an embodiment, crosstalk between a RoCU system and another communication network, e.g. Ethernet, is handled by using a bandpass filter to filter out a portion of the IF signal received at the receiver of the RU. The IF signal that is received at the receiver comprises the actual data signal sent by the RH, noise and a possible NEXT signal. The frequency portion filtered out is different from the first frequency range, i.e. the frequency range where the data signal is to be sent. Consequently, the frequency portion filtered out of the IF signal comprises noise and NEXT but not the data signal. Power is measured on the frequency portion filtered out. Based on the measured power it is detected if there is any NEXT. The action to take if NEXT is detected is to move the data signal to a higher frequency range where NEXT is expected to be lower.

As described above, the uplink transmission of data signals is moved to a higher frequency range. However, it may also be of interest to move the downlink data transmission of data to a higher frequency, based on the detected NEXT, for increasing the SNR also of the data sent in DL in the RoCU system, but also or alternatively to protect the another communication network from crosstalk from the RoCU system.

A normal assumption about the background noise level in a CAT5e cable is −150 dBm/Hz, as shown in http://www.ieee802.org/3/10GBT/public/may03/pagnanelli_3_0503.pdf. A CAT5e cable is an example of a cable often used in buildings and which may be used in a RoCU system. FIG. 5 shows a theoretical calculation of the level of alien NEXT generated into a CAT5 cable when the disturbing communication network is 1000BASE-T, which is an example of a communication network that may be used adjacent a RoCU system. In this example the metallic conductor used in the RoCU system is then a CAT5 cable. 1000BASE-T is Gigabit Ethernet on copper cables; using four pairs of Category 5 unshielded twisted pair to achieve the gigabit data rate. The calculation is based on the following formula 35-15*10*log 10(f/100) dB, and a theoretical calculation of a 1000BASE-T PSD, which is the signal spectrum of an Ethernet signal in 1000BASE-T. The formula is described in IEEE 802.3 2008 Section 3, annex 40A, and specifies the recommended maximum tolerable alien Next coupling, i.e. the NEXT transfer function between the Ethernet cable and the RoCU cable at a worst condition. From FIG. 5 it can be seen that by filtering out frequencies below say 100 or 50 MHz it should be possible to detect if NEXT is present or not, as long as the RoCU signal is sent on a higher frequency than 100 MHz. For example, at 100 MHz, the power level of the NEXT from a 1000BASE-T into a CAT5 cable would theoretically be 125 dB, and the noise level is as described above 150 dB. At 50 MHz, the NEXT power level would be 120 dB. Consequently, if there is any NEXT in the CAT5 cable it is detectable at 100 MHz or lower frequencies.

As the level of the received NEXT varies with the orientation of the pairs of metallic conductors in the CAT 5 cable and also with the orientation of the adjacent cables (i.e. the cables of the 1000BASE-T network), it may be necessary to measure the NEXT power level on a plurality or all of the pairs of metallic conductors in the cable.

Figure 6:
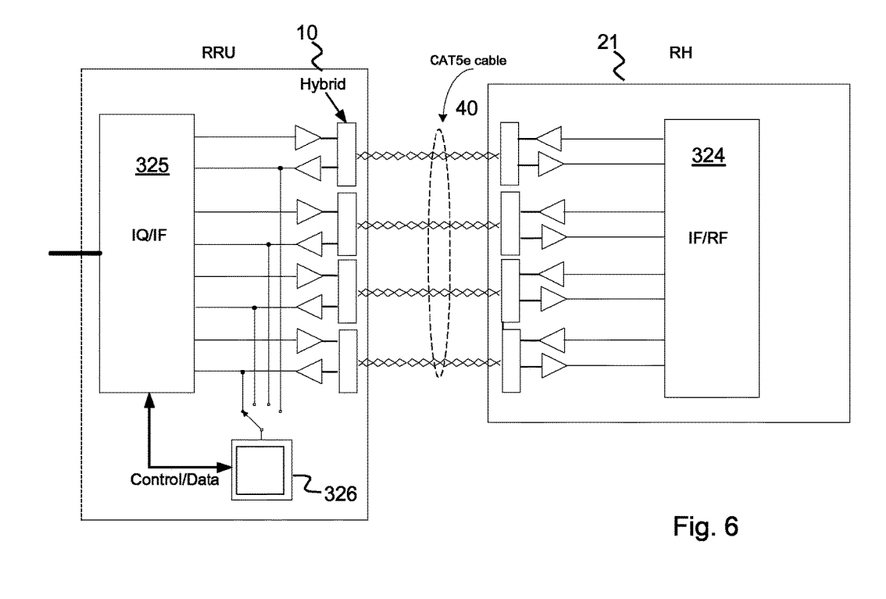
FIG. 6 is a schematic block diagram illustrating a RoCU system in more detail, according to further possible embodiments.

FIG. 6 shows a functional block diagram of a part of a RoCU system comprising an RU 10 (marked RRU in the figure) and an RH 21. A NEXT detection unit 326 of the RU gets access to each received pair of the cable via the switch shown in the figure. The NEXT detection unit 326 communicates with an IQ data flow to/from IF conversion unit, IQ/IF conversion unit 325 of the RRU. The RH 21 comprises an IF/RF conversion unit 324. The metallic conductors 40 connecting the RU 10 with the RH 21 may be twisted pair cables, for example CAT5e cables.

Figure 7A:
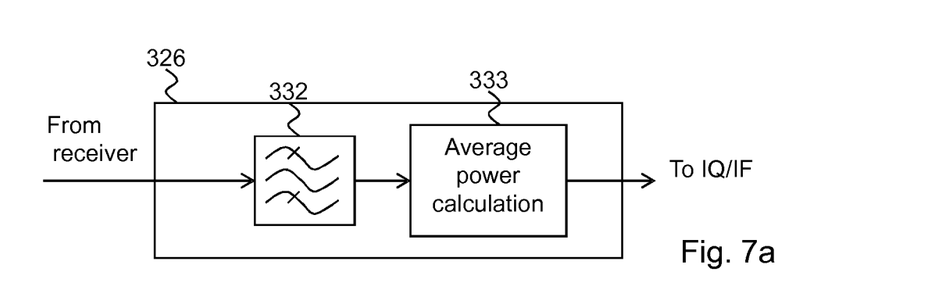
FIGS. 7a and 7b are schematic block diagrams of a NEXT detection unit according to possible embodiments.
Figure 7B:
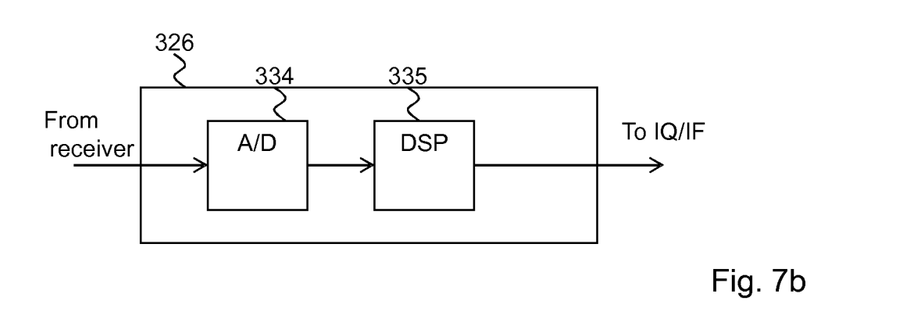

FIGS. 7a and 7b show two different embodiments of a NEXT detection unit 326. The input signal of the NEXT detection unit comes from the receiver and the received signal for example as described in FIG. 6. In the embodiment of FIG. 7a, the NEXT detection unit 326 comprises a programmable band pass filter 332, where the cut off frequencies are programmable so that it is possible to select any part of the received frequency spectra where a NEXT measurement can be done. The NEXT detection unit further comprises a NEXT measurement unit 333 for performing NEXT measurements. The NEXT measurement unit 333 may perform an average power calculation of the filtered input signal. The result of the measurement unit 333 is fed to the IQ/IF unit 325 which may use the result for determining a suitable frequency range to send the signal at, and to trigger the RH to send the signal at the determined frequency range. The embodiment of FIG. 7b comprises an A/D-converter 334 for digitizing the analog input signal and a digital signal processor, DSP, 335. The DSP 335 may be arranged to perform any or all of the following functions: Filtering similar to the filtering performed by the band pass filter 332; Average power calculation similar to the average power calculation performed by the NEXT measurement unit 333; Fast Fourier Transformation, FFT, and spectral analysis on the digitized input signal. By performing an FFT followed by a spectral analysis, more information about the NEXT frequency spectra could be extracted from the input signal. The information may comprise information of e.g. the whole spectra of FIG. 5. This information is provided to the IQ/IF unit 325 which may use the information to decide if it is necessary to change the IF frequency and also a suitable frequency range to which the signal to be transmitted from the RH is to be moved. For example, it may be a good idea to move the signal to the frequency range where the notch between the main lobe and the first side lobe of the NEXT signal is situated or to the notch between the first side lobe and the second side lobe (in the example of FIG. 5 situated at approximately 250 MHz).

Figure 8:
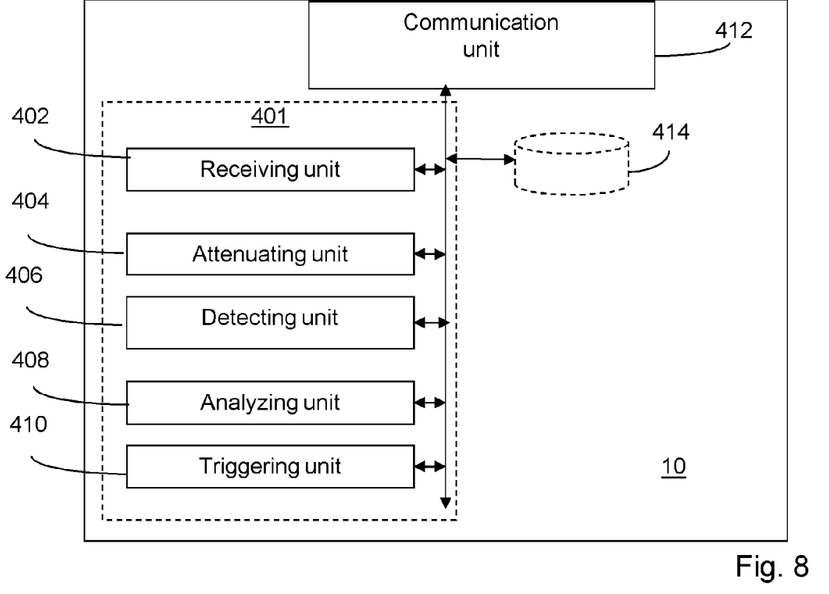
FIG. 8 is a schematic block diagram of a radio unit according to possible embodiments.

FIG. 8 describes an embodiment of an RU 10 operable in a base station system of a wireless communication network, configured for reducing interference at the RU. The base station system comprising a BBU, the RU 10 and a plurality of RHs. The RU 10 is connected to the plurality of RHs via a number of metallic conductors. A signal is to be communicated at a first frequency range over one of the number of metallic conductors from one of the plurality of RHs. The radio unit 10 comprises a detection unit 406 for detecting if there is any near end crosstalk, NEXT at a receiver (at communication unit 412) of the RU, wherein the receiver is arranged to be connected to the one of the number of metallic conductors. The radio unit 10 further comprises a triggering unit 410 for triggering, when NEXT is detected, the one of the plurality of RHs to send the signal to be communicated over the one of the number of metallic conductors at a second frequency range different from the first frequency range where a lower NEXT is expected than at the first frequency range. A mentioned, the RU 10 further comprises a communication unit 412, which may be considered to comprise conventional means for communicating from and/or to the other nodes in the network, such as the RHs 21-26 and the BBU 30. The conventional communication means may include at least one transmitter and at least one receiver. The RU 10 may further comprise one or more storage units or memories 414.

According to another embodiment, the RU 10 may further comprise a receiving unit 402 for receiving the signal to be communicated at the first frequency range at the receiver of the RU. Further, the detecting unit 406 may be arranged for detecting the NEXT at a detecting frequency range outside the first frequency range.

According to another embodiment, the detecting unit 406 may be arranged for detecting the NEXT at a detecting frequency range lower than the first frequency range.

According to another embodiment, the detecting unit 406 is arranged for detecting the NEXT at a point of time when there is no signal received from the one of the plurality of RHs.

According to another embodiment, the RU 10 may further comprise an attenuating unit 404 for attenuating frequencies outside a detecting frequency range when the detecting is performed.

According to another embodiment, the RU 10 may further comprise an analyzing unit 408 for analyzing the detected NEXT to determine from which type of communication network the NEXT originates.

According to another embodiment, the RU 10 may further comprise an analyzing unit 408 for analyzing the detected NEXT to determine suitable frequencies for the second frequency range in which the NEXT is expected to be low.

According to another embodiment, the analyzing unit 408 is arranged for analyzing the detected NEXT to determine the suitable frequencies for the second frequency range in which the NEXT is expected to be low by analyzing the detected NEXT to detect a frequency range around a notch between a main lobe and a first side lobe of the NEXT, and wherein the detected frequency range is selected to be the second frequency range.

According to another embodiment the detecting unit 406 is arranged to detect the NEXT by measuring a power level at the detecting frequency range at the receiver, and determining that NEXT is detected when the measured power level is above a threshold.

According to another embodiment, the NEXT originates from another communication network, such as Ethernet.

The receiving unit 402, the attenuating unit 404, the detecting unit 406, the analyzing unit 408 and the triggering unit 410 may be arranged in an arrangement 401. The arrangement 401 could be implemented e.g. by one or more of: a processor or a micro processor and adequate software and storage therefore, a Programmable Logic Device, PLD, or other electronic component(s)/processing circuit(s) configured to perform the actions, or methods, mentioned above.

Figure 9:
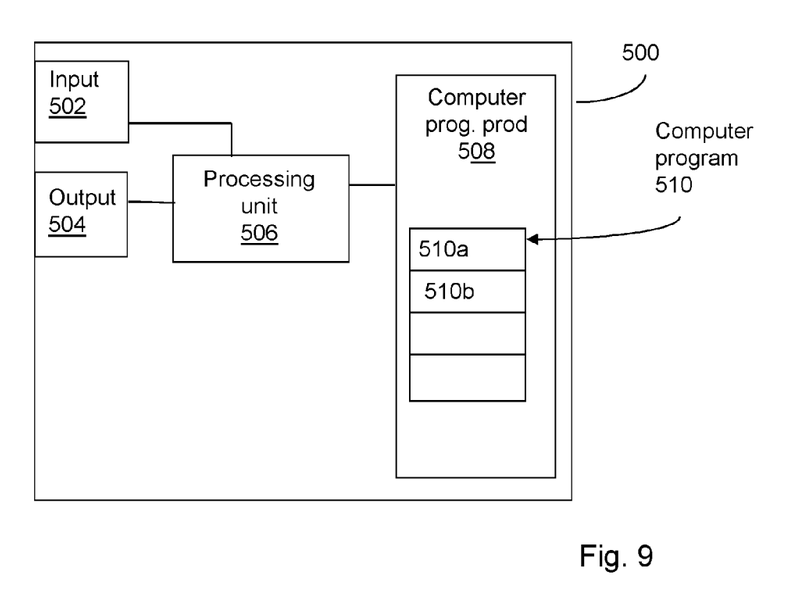
FIG. 9 is a schematic block diagram of an arrangement of a radio unit according to possible embodiments.

FIG. 9 schematically shows an embodiment of an arrangement 500 for use in an RU 10, which arrangement also can be an alternative way of implementing an embodiment of the arrangement 401 illustrated in FIG. 8. Comprised in the arrangement 500 is a processing unit 506, e.g. with a DSP, Digital Signal Processor, or a microprocessor. The processing unit 506 may be a single unit or a plurality of units to perform different actions of procedures described herein. The arrangement 500 may also comprise an input unit 502 for receiving signals from other entities, and an output unit 504 for providing signal(s) to other entities. The input unit 502 and the output unit 504 may be arranged as an integrated entity.

Furthermore, the arrangement 500 comprises at least one computer program product 508 in the form of a non-volatile or volatile memory, e.g. an EEPROM (Electrically Erasable Programmable Read-only Memory), a flash memory, a disk drive or a RAM (Random-access memory). The computer program product 508 comprises a computer program 510, which comprises code means, which when executed in the processing unit 506 in the arrangement 500 causes the arrangement to perform the actions of any of the procedures described earlier in conjunction with FIG. 4.

The computer program 510 may be configured as a computer program code structured in computer program modules. Hence, in an exemplifying embodiment, the code means in the computer program 510 of the arrangement 500 comprises a detecting module 510a for detecting if there is any near end crosstalk, NEXT, at a receiver of the RU, the receiver being connected to one of the number of metallic conductors. The code means further comprises a triggering module 510b for triggering, when NEXT is detected, the one of the plurality of RHs to send the signal to be communicated over the one of the number of metallic conductors at a second frequency range different from the first frequency range where a lower NEXT is expected than at the first frequency range.

The processing unit 506 may be a single Central processing unit, CPU, but it could also comprise two or more processing units. For example, the processing unit may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM (Electrical Erasable Programmable ROM), and the computer program modules described above could in alternative embodiments be distributed on different computer program products in the form of memories within the network node.

Although the code means in the embodiments disclosed above in conjunction with FIG. 9 are implemented as computer program modules which when executed in the processing unit causes the apparatus to perform the actions described above in the conjunction with figures mentioned above, at least one of the code means may in alternative embodiments be implemented at least partly as hardware circuits.

Except for the already shown advantages, the invention described in this document may have any or all of the following advantages: By detecting the NEXT it is possible to mitigate the reduced performance by changing IF band. The invention may be used to handle possible violation of emission regulations. The invention may be used to detect other noise than alien crosstalk.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby.

The invention claimed is:

1. A method performed by a radio unit (RU) operable in a base station system of a wireless communication network, the method comprising:
   detecting, in a detecting frequency range, Near End Crosstalk (NEXT) on a metallic conductor that couples a receiver of the RU to a Radio Head (RH) that is to transmit data signals to the receiver via the metallic conductor, using a first frequency range that is higher than the detecting frequency range, said NEXT being stronger in the detecting frequency range than in the first frequency range;
   evaluating the NEXT and correspondingly identifying a second frequency range that is higher than the first frequency range, said NEXT being more attenuated in the second frequency range than in the first frequency range; and indicating to the RH to use the second frequency range, instead of the first frequency range, for transmitting the data signals to the RU.

2. The method of claim 1, wherein evaluating the NEXT and correspondingly identifying the second frequency range comprises identifying a frequency range corresponding to a spectral null associated with a harmonic of the NEXT.

3. The method of claim 1, wherein the data signals convey uplink data from one or more wireless devices connected to the wireless communication network via the RH, and further comprising performing or repeating the method of claim 1, in response to one or more of the wireless devices reporting degraded signal quality.

4. The method of claim 1, wherein a plurality of RHs are associated with the RU, each RH coupled to the RU through a respective metallic conductor, and wherein detecting NEXT at the receiver of the RU comprises performing detection measurements on two or more of the metallic conductors.

5. A radio unit (RU) configured for operation in a base station system of a wireless communication network, the RU comprising:

a receiver and a transmitter configured for receiving from and transmitting to a Radio Head (RH); and processing circuitry operatively associated with the receiver and transmitter and configured to:

detect, in a detecting frequency range, Near End Crosstalk (NEXT) on a metallic conductor that couples the receiver of the RU to the Radio Head (RH), where the RH is to transmit data signals to the receiver via the metallic conductor, using a first frequency range that is higher than the detecting frequency range, said NEXT being stronger in the detecting frequency range than in the first frequency range;

evaluate the NEXT and correspondingly identify a second frequency range that is higher than the first frequency range, said NEXT being more attenuated in the second frequency range than in the first frequency range; and indicate to the RH to use the second frequency range, instead of the first frequency range, for transmitting the data signals to the RU.

6. The RU of claim 5, wherein the processing circuitry is configured to evaluate the NEXT and correspondingly identify the second frequency range by identifying a frequency range corresponding to a spectral null associated with a harmonic of the NEXT.

7. The RU of claim 5, wherein the data signals convey uplink data from one or more wireless devices connected to the wireless communication network via the RH, and wherein the processing circuitry is configured to repeat the operations of claim 5, in response to one or more of the wireless devices reporting degraded signal quality.

8. The RU of claim 5, wherein a plurality of RHs are associated with the RU, each RH coupled to the RU through a respective metallic conductor, and wherein the processing circuitry is configured to detect NEXT at the receiver of the RU by performing detection measurements on two or more of the metallic conductors.

* * * * *